(12) United States Patent
Cho

(10) Patent No.: US 9,766,377 B2
(45) Date of Patent: Sep. 19, 2017

(54) WINDOW FOR DISPLAY DEVICE AND DISPLAY DEVICE INCLUDING THE WINDOW

(71) Applicant: Samsung Display Co., Ltd., Yongin (KR)

(72) Inventor: Jong-Hwan Cho, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 123 days.

(21) Appl. No.: 14/094,158

(22) Filed: Dec. 2, 2013

(65) Prior Publication Data

US 2014/0356586 A1    Dec. 4, 2014

(30) Foreign Application Priority Data

Jun. 4, 2013  (KR) .................. 10-2013-0064155

(51) Int. Cl.
| | |
|---|---|
| G02B 1/00 | (2006.01) |
| B32B 27/30 | (2006.01) |
| B32B 27/36 | (2006.01) |
| G02B 1/14 | (2015.01) |
| G02B 1/10 | (2015.01) |
| G06F 1/16 | (2006.01) |
| G02F 1/1333 | (2006.01) |

(52) U.S. Cl.
CPC .............. *G02B 1/14* (2015.01); *G02B 1/105* (2013.01); *G06F 1/1637* (2013.01); *G02F 2001/133331* (2013.01); *Y10T 428/24628* (2015.01); *Y10T 428/254* (2015.01); *Y10T 428/269* (2015.01); *Y10T 428/31507* (2015.04); *Y10T 428/31533* (2015.04); *Y10T 428/31786* (2015.04); *Y10T 428/31797* (2015.04); *Y10T 428/31913* (2015.04); *Y10T 428/31938* (2015.04)

(58) Field of Classification Search
CPC ...... G02B 5/0242; G02B 5/32; G02B 5/0278; G02B 1/105; B32B 27/308; B32B 27/365; G06F 1/1637
USPC ........ 428/174, 327, 339, 220, 480, 483, 523
See application file for complete search history.

(56) References Cited

U.S. PATENT DOCUMENTS

| | | | |
|---|---|---|---|
| 8,508,850 B2 * | 8/2013 | Yang et al. | 359/599 |
| 2005/0266159 A1 * | 12/2005 | Lee et al. | 427/162 |
| 2007/0128442 A1 * | 6/2007 | Buehler | C08K 5/0008 428/411.1 |
| 2007/0267130 A1 * | 11/2007 | Wang et al. | 156/231 |
| 2010/0321919 A1 * | 12/2010 | Yang | 362/84 |
| 2011/0159278 A1 * | 6/2011 | Lee et al. | 428/336 |
| 2011/0242463 A1 * | 10/2011 | Park et al. | 349/106 |
| 2013/0002133 A1 * | 1/2013 | Jin | H01L 51/524 313/511 |
| 2013/0300980 A1 * | 11/2013 | Nishimura et al. | 349/64 |

FOREIGN PATENT DOCUMENTS

| | | |
|---|---|---|
| JP | 2009-196196 | 9/2009 |
| KR | 10-2004-0079118 | 9/2004 |
| KR | 10-2008-0005839 | 1/2008 |

* cited by examiner

*Primary Examiner* — Joanna Pleszczynska
(74) *Attorney, Agent, or Firm* — H.C. Park & Associates, PLC

(57) ABSTRACT

A display device window includes a polymer blending resin layer and a light transmittance film disposed on the polymer blending resin layer. The polymer blending resin layer includes a continuous phase and a dispersion phase.

20 Claims, 1 Drawing Sheet

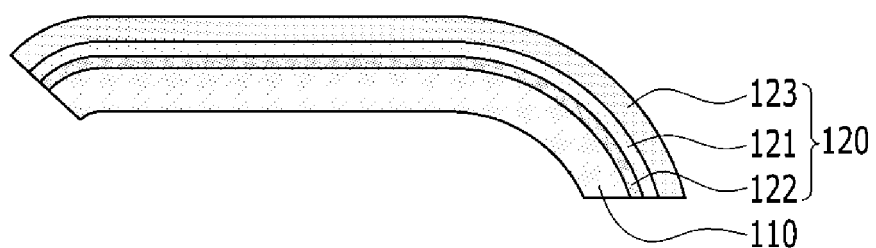

WINDOW FOR DISPLAY DEVICE AND DISPLAY DEVICE INCLUDING THE WINDOW

CROSS-REFERENCE TO RELATED APPLICATION

This application claims priority from and the benefit of Korean Patent Application No. 10-2013-0064155, filed on Jun. 4, 2013, which is incorporated for all purposes as if set forth herein.

BACKGROUND

Field

Exemplary embodiments relate to display technology, and, more particularly, to a window for a display device and a display device including the same.

Discussion

Conventional display devices include, for example, liquid crystal displays (LCDs), plasma display panels (PDPs), organic light emitting diode displays (OLEDs), field emission displays (FED), electrophoretic displays (EPDs), electrowetting displays (EWDs), and the like. These display devices typically include a display module configured to display an image and a window panel configured to protect the display module. The window may be molded into a bent shape, and, as such, may exhibit a birefringence in the bent part due, at least in part, to stresses that may be applied to the window during a molding process. The existence of a birefringence may cause an optical interference effect in association with the window, such as a light-scattering effect.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a window for a display device configured to minimize (or at least reduce) birefringence changes according to external stress.

Exemplary embodiments provide a display device including the window.

Additional aspects will be set forth in the detailed description which follows and, in part, will be apparent from the disclosure, or may be learned by practice of the inventive concept.

According to exemplary embodiments, a display device window includes a polymer blending resin layer and a light transmittance film disposed on the polymer blending resin layer. The polymer blending resin layer includes a continuous phase and a dispersion phase.

According to exemplary embodiments, a display device includes the display device window.

According to exemplary embodiments, the display device window may be configured to minimize (or otherwise reduce) birefringence changes that may otherwise occur in response to an external stress, as well as configured to improve reliability of a device including the display device window.

The foregoing general description and the following detailed description are exemplary and explanatory and are intended to provide further explanation of the claimed subject matter.

BRIEF DESCRIPTION OF THE DRAWING

The accompanying drawing, which is included to provide a further understanding of the inventive concept and is incorporated in and constitutes a part of this specification, illustrates exemplary embodiments of the inventive concept, and together with the description serves to explain principles of the inventive concept.

FIG. 1 is a cross-sectional view of a display device window, according to exemplary embodiments.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying FIGURE, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to a sectional illustration that is a schematic illustration of idealized exemplary embodiments and/or intermediate structures. As such, variations from the shapes of the illustration as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawing are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a cross-sectional view of a display device window, according to exemplary embodiments.

A display device window (or window) 100 includes a polymer blending resin layer 110 and a light transmittance film 120 disposed on at least one surface of the polymer blending resin layer 110. Although specific reference will be made to this particular implementation, it is also contemplated that window 100 may embody many forms and include multiple and/or alternative components.

According to exemplary embodiments, the polymer blending resin layer 110 may include an injection moldable polymer resin. To this end, the polymer blending resin layer 110 may include a continuous phase and a dispersion phase. For instance, the polymer blending resin layer 110 may include a polyolefin resin (e.g., polystyrene, polyethylene, polypropylene, and/or the like), a thermoplastic resin (e.g., polyether ether ketone resin, polyester, polysulfone, poly- phenylene oxide, polyimide, polyacetal, and/or the like), a thermosetting resin (e.g., a phenolic resin, a melamine resin, a silicone resin, an epoxy resin, and/or the like), etc.

In exemplary embodiments, the polymer blending resin layer 110 may include, for example, a blended resin including at least one of polycarbonate (PC), polymethylmethacrylate (PMMA), a cycloolefin polymer (COP), polyethylene terephthalate (PET), polyethersulfone (PES), and polyethylene naphthalate (PEN), etc. For instance, the polymer blending resin may be a polycarbonate-polymethylmethacrylate (PC-PMMA) blending resin, a polyethylene terephthalate-polycarbonate (PET-PC) blending resin, a polyethylene terephthalate-polymethylmethacrylate (PET-PMMA) blending resin, a cycloolefin polymer-polycarbonate (COP-PC) blending resin, a cycloolefin polymer-polymethylmethacrylate (COP-PMMA) blending resin, etc.

According to exemplary embodiments, the polymer blending resin layer 110 may include different kinds of polymer resins. For instance, a first polymer resin may be a continuous phase and a second polymer resin may be a dispersion phase. For example, in the polycarbonate-polymethylmethacrylate (PC-PMMA) blending resin, the continuous phase may be polycarbonate (PC) and the dispersion phase may be polymethylmethacrylate (PMMA); however, it is also contemplated that the continuous phase may be polymethylmethacrylate (PMMA), and the dispersion phase may be polycarbonate (PC). In this manner, when the polymer blending resin layer 110 including the continuous phase and the dispersion phase are used, the dispersion phase included in the polymer blending resin layer 110 may function to scatter light and to prevent the light from being distorted in a bent part of the window. To this end, other improvements may be realized, such as improved appearance, reliability, etc.

In exemplary embodiments, the combination of materials utilized for the polymer blending resin layer 110 may be selected based on the properties of a polymer. For example, when polycarbonate (PC) is blended with polymethylmethacrylate (PMM) to form a polycarbonate-polymethylmethacrylate PC-PMM blending resin, impact resistance of the polycarbonate and transparency of the polymethylmethacrylate may be realized.

According to exemplary embodiments, a polymer blending resin layer 110 may include a continuous phase and a dispersion phase. The continuous phase may be a matrix, and the dispersion phase may have a particle shape. The dispersion phase may be present in an amount of about 3 weight percent (wt %) to about 40 wt % based on the total weight of the polymer blending resin layer 110. For instance, the dispersion phase may be about 13 wt % to about 30 wt %, such as about 18 wt % to about 25 wt %, e.g., about 20 wt % to about 23 wt %, and the like. To this end, the continuous phase may be present in an amount of about 60 wt % to about 97 wt % based on the total weight of the polymer blending resin layer 110. For example, the continuous phase may be about 65 wt % to about 92 wt %, such as about 72 wt % to about 85 wt %, e.g., about 77 wt % to about 80 wt %, etc. In this manner, light distortion effects of the window 100 including the polymer blending resin layer 110 may be controlled based on the respective amounts of the constituent elements of the polymer blending resin layer 110.

The dispersion phase may have a particle diameter ranging from about 1 nm to about 90 μm, e.g., about 10 nm to about 9000 nm, such as about 100 nm to about 900 nm, etc. In this manner, the particle diameter of the dispersion phase may be adjusted within the range based on desired light scattering effects on a surface of the window 100.

According to exemplary embodiments, the polymer blending resin layer 110 may further include one or more other constituent elements. For example, the polymer blending resin layer 110 may include strontium carbonate (SrCO$_3$), a material having a negative birefringence, and/or the like.

In exemplary embodiments, the window 100 may have a thickness of less than or equal to about 1 mm, and the polymer blending resin layer 110 may have a thickness of about 5 μm to about 500 μm, e.g., about 55 μm to about 450 μm, such as about 155 μm to about 350 μm, for example about 200 μm to about 300 μm, for instance about 50 μm to about 200 μm. When the polymer blending resin layer 110 has a thickness within one or more of these ranges, a space that the polymer blending resin may flow into during an injection-molding process in a film insert manner may be secured. As such, impact resistance and surface hardness qualities of the polymer blending resin layer 110 may be achieved and relatively high-quality appearance may be obtained.

As seen in FIG. 1, the light transmittance film 120 may include a substrate 121, a binder layer 122, and a hard coating layer 123.

The substrate 121 may be a plastic substrate used in association with a film insert forming process. For example, the substrate 121 may be or include a polyethylene terephthalate (PET) film, a polycarbonate (PC) film, a polymethylmethacrylate (PMMA) film, a polycarbonate/polymethylmethacrylate (PC/PMMA) film, or a combination thereof. To this end, the plastic substrate 121 may have a thickness, for example, of about 50 μm to about 100 μm, e.g., about 60 μm to about 90 μm, such as about 70 μm to about 80 μm.

According to exemplary embodiments, the binder layer 122 may be disposed between the polymer blending resin layer 110 and the substrate 121. In this manner, the binder layer 122 may bind the polymer blending resin layer 110 to the substrate 121. The binder layer 122 may include, for example, any suitable binder, such as, for example, an acryl-based binder, a polyester-based binder, etc.

The hard coating layer 123 may be disposed on the surface of the window 100 to improve surface hardness. The hard coating layer 123 may include, for example any suitable organic material, inorganic material, or organic/inorganic composite compound. For instance, the organic material may include, an acryl-based compound, an epoxy-based compound, etc., or a combination thereof. The inorganic material may include, for example, silica, alumina, etc., or a combination thereof. The organic/inorganic composite compound may include, for example, polysilsesquioxane (PSQ). The hard coating layer 123 may be a monolayer or a multilayer structure. In this manner, the hard coating layer 123 may have a thickness, for example, of about 30 μm to about 200 μm, e.g., about 80 μm to about 150 μm, such as about 110 μm to about 120 μm.

In exemplary embodiments, the light transmittance film 120 may be, for example, an in mold decoration (IMD) film. Further, the light transmittance film 120 may be formed on at least one surface of the polymer blending resin layer 110; however, it is also contemplated that the light transmittance film 120 may be formed on multiple surfaces of the polymer blending resin layer 110. For example, the polymer blending resin layer 110 may be disposed between instances of multiple light transmittance films 120.

According to exemplary embodiments, the window 100 may be manufactured using any suitable technique. For example, the window 100 may be formed via injection-molding the light transmittance film 120 and a polymer blending resin in a film insert manner. It is noted that the window 100 may be manufactured into other forms of windows besides a bent window, such as, for instance, a rollable window, a foldable window, etc.

In exemplary embodiments, the window 100 may include a polymer blending resin structure and may exhibit a photoelastic coefficient tending towards zero (0), as well as minimize (or otherwise reduce) a birefringence change according to one or more applied external stresses. As such, the window 100 may minimize (or otherwise reduce) light distortion effects in a bent part thereof.

According to exemplary embodiments, window 100 may utilized in association with any suitable display device, such as, for example, LCDs, OLEDs, PDPs, FEDs, EPDs, EWDs, etc. To this end, window 100 may be disposed on a display module (not shown). The display module may be associated with any one of these display devices.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device window, comprising:
   a polymer blending resin layer comprising a continuous phase and a dispersion phase; and
   a light transmittance film disposed on the polymer blending resin layer,
   wherein the display device window comprises a first light transmissive portion that is flat and a second light transmissive portion that is curved, the second light transmissive portion extending from the first light transmissive portion and being bent from the first light transmissive portion causing, at least in part, stress-induced birefringence in the second light transmissive portion,
   wherein the polymer blending resin layer is configured to reduce the stress-induced birefringence in the second light transmissive portion, and
   wherein the light transmittance film comprises a substrate that is from about 50 μm to about 100 μm thick.

2. The display device window of claim 1, wherein the polymer blending resin layer comprises at least two of polycarbonate (PC), polymethylmethacrylate (PMMA), a cycloolefin polymer (COP), polyethylene terephthalate (PET), polyethersulfone (PES), and polyethylene naphthalate (PEN).

3. The display device window of claim 2, wherein the polymer blending resin layer comprises a polycarbonate-polymethylmethacrylate (PC-PMMA) blending resin.

4. The display device window of claim 3, wherein the continuous phase is polycarbonate (PC) and the dispersion phase is polymethylmethacrylate (PMMA).

5. The display device window of claim 3, wherein the continuous phase is polymethylmethacrylate (PMMA) and the dispersion phase is polycarbonate (PC).

6. The display device window of claim 1, wherein the dispersion phase is about 3 weight percent to about 40 weight percent of the total weight of the polymer blending resin layer.

7. The display device window of claim 1, wherein the continuous phase is about 60 weight percent to about 97 weight percent of the total weight of the polymer blending resin layer.

8. The display device window of claim 1, wherein a particle diameter of the dispersion phase is about 1 nm to about 90 µm.

9. The display device window of claim 1, wherein the polymer blending resin layer is about 5 µm to about 500 µm thick.

10. The display device window of claim 9, wherein the polymer blending resin layer is about 50 µm to about 200 µm thick.

11. The display device window of claim 1, wherein the polymer blending resin layer comprises strontium carbonate ($SrCO_3$).

12. The display device window for a display device of claim 1, wherein the light transmittance film comprises a substrate, the substrate comprising at least one of a polyethylene terephthalate (PET) film, a polycarbonate (PC) film, a polymethylmethacrylate (PMMA) film, and a polycarbonate/polymethylmethacrylate (PC/PMMA) film.

13. The display device window of claim 12, wherein the light transmittance film further comprises a binder layer disposed between the polymer blending resin layer and the substrate.

14. The display device window of claim 13, wherein the light transmittance film further comprises a hard coating layer disposed on the substrate.

15. The display device window of claim 14, wherein the hard coating layer comprises an organic material, an inorganic material, or an organic/inorganic composite compound.

16. The display device window of claim 1, wherein the light transmittance film comprises an in-mold decoration film.

17. The display device window of claim 1, wherein a thickness of the display device window is less than or equal to about 1 mm.

18. The display device window of claim 14, wherein the substrate is disposed between the hard coating layer and the binder layer.

19. The display device window of claim 18, wherein the substrate is arcuately shaped.

20. A display device comprising the display device window of claim 1.

* * * * *